US008452624B2

(12) United States Patent
Dufresne et al.

(10) Patent No.: US 8,452,624 B2
(45) Date of Patent: May 28, 2013

(54) ONLINE TRAVEL RESERVATION SYSTEM AND METHOD DELIVERING RESTRICTION-AWARE TRAVEL OPPORTUNITIES

(75) Inventors: Thierry Dufresne, Opio (FR); Gilles Chaumont, Valbonne (FR); Cedric Dourthe, Nice (FR)

(73) Assignee: Amadeus S.A.S., Sophia Antipolis (FR)

( * ) Notice: Subject to any disclaimer, the term of this patent is extended or adjusted under 35 U.S.C. 154(b) by 0 days.

(21) Appl. No.: 12/812,509

(22) PCT Filed: Jan. 12, 2009

(86) PCT No.: PCT/EP2009/050244
§ 371 (c)(1), (2), (4) Date: Jul. 12, 2010

(87) PCT Pub. No.: WO2009/090145
PCT Pub. Date: Jul. 23, 2009

(65) Prior Publication Data

US 2010/0299318 A1 Nov. 25, 2010

Related U.S. Application Data

(60) Provisional application No. 61/021,055, filed on Jan. 15, 2008.

(30) Foreign Application Priority Data

Jan. 14, 2008 (EP) .................................... 08300030

(51) Int. Cl.
*G06Q 10/00* (2012.01)

(52) U.S. Cl.
USPC .................................................. 705/5; 705/6

(58) Field of Classification Search
USPC ............................................ 705/5, 6, 400, 7
See application file for complete search history.

(56) References Cited

U.S. PATENT DOCUMENTS 6,609,098 B1 * 8/2003 DeMarcken ...................... 705/6
8,126,783 B2 * 2/2012 Steeb et al. ................ 705/26.64

(Continued)

FOREIGN PATENT DOCUMENTS

WO 2005003888 A2 1/2005

OTHER PUBLICATIONS

"Qantas Airwats Takes Bold Step to Simplify Fare Rules," published by www.quantas.com on Jul. 15, 2005, pp. 1-2 of 2.*

(Continued)

*Primary Examiner* — Brian Epstein
(74) *Attorney, Agent, or Firm* — Wood, Herron & Evans, LLP

(57) ABSTRACT

An online reservation system including a fare search engine is described. The system comprises a database of published fares, a database of rules attached to the published fares and a fare family solver to categorize the published fares into sets of predefined generic fare families on the basis of the rules attached to the published fares. The fare family solver further comprises a generic partitioning fare family database holding the attributes of each predefined generic fare family allowing to determine to which fare family the published fares belong to. The attributes of each predefined generic fare family are first set up by a fare family composer operated by an administrator of the system.

The online reservation system of the invention allows returning to the end-users of online travel service providers travel solutions categorized in families of fares having various ranges of prices and levels of restrictions attached to.

15 Claims, 5 Drawing Sheets

U.S. PATENT DOCUMENTS

| | | | | |
|---|---|---|---|---|
| 2002/0065688 | A1* | 5/2002 | Charlton et al. | 705/5 |
| 2003/0018500 | A1* | 1/2003 | Daughtrey | 705/5 |
| 2007/0073562 | A1* | 3/2007 | Brice et al. | 705/5 |
| 2007/0233529 | A1* | 10/2007 | Isnardon et al. | 705/6 |
| 2007/0233530 | A1* | 10/2007 | Blaszka et al. | 705/6 |
| 2007/0233617 | A1* | 10/2007 | Gillespie | 705/400 |
| 2008/0027765 | A1* | 1/2008 | Gunn et al. | 705/5 |
| 2008/0086383 | A1* | 4/2008 | Steeb et al. | 705/26 |
| 2009/0106170 | A1* | 4/2009 | Thurlow et al. | 705/400 |

OTHER PUBLICATIONS

Hungarian Search Report, dated Sep. 26, 2011, in Application No. 201005065-6.

* cited by examiner

Prior Art

ONLINE TRAVEL RESERVATION SYSTEM AND METHOD DELIVERING RESTRICTION-AWARE TRAVEL OPPORTUNITIES

FIELD OF THE INVENTION

The present invention relates generally to the field of online travel reservation. It more particularly relates to a method and system to enhance the offering of travel opportunities, including low-cost travel solutions and other more flexible fares, to the end-users of independently controlled online reservation systems.

BACKGROUND OF THE INVENTION

Online reservation systems such as the ones deployed by airlines companies and various travel service providers including the global distribution systems or GDS; i.e., any of the few companies serving the travel industry such as AMADEUS, an European based world-wide provider of travel solutions, are fast, convenient and very cost effective. They allow end-users, i.e., travelers and agents of travel agencies, to quickly book a trip through the various travel search tools made available by the travel service provider to which a travel agency is affiliated or to any online travel service end-user has access over the Internet. Available 24-hour a day these online reservation systems are accessible from all over the world providing to their end-users a compilation of low-cost travel solutions for a requested itinerary.

In a very highly competitive business such as the one of the airline travel industry, the travel search tools that have been deployed by travel service providers are essentially designed and tuned to deliver low-cost solutions to the end-users. Indeed, for many travelers, the prime discriminating factor for choosing a travel solution remains the cost. Hence, to have a chance to be chosen any airline must always have an attractive offering of low-cost travel solutions. However, to remain profitable in such a competitive environment airlines must at the same time carefully control their operational expenses. It is crucial for them to be able to sell most of the seats they are offering at any point of time since their profit margin becomes positive only after the actual seat occupation rate of the carriers they are operating reaches a high mark generally well above half occupation. As a consequence the pricing policy of any airline is a very sophisticated and complex matter. Many fares are published addressing all segments of the market and all sorts of customers (typically, leisure and business travelers) in an attempt to best fill carriers however not solely with low-cost sold seats.

Low-cost published fares have often stringent restrictions attached to. Typically, low-cost fares are round-trip fares imposing constraints such as a minimum stay at destination possibly including a Saturday night. Also, those fares are often non-changeable and non-refundable. Because travel search tools are mainly tailored to first retrieve low-cost travel solutions, only those fares tend to be displayed to the end-users of the online travel sites mentioned above. Generally, travelers are bound to exercise a choice among a list of low-costs travel solutions while selected airlines may also propose fares with fewer restrictions, yet sold at higher prices, that could greatly contribute to increase their profit margin but which are not however readily displayed.

A notable exception to this is however described in patent application WO 2005/055099 'System and method for processing a price information request' introducing group of fares, i.e.: fare families sharing the same level of restrictions so as to broaden the offering of travel solutions, making visible to the end-users many more opportunities which are a strong incentive to buy a more expensive travel solution carrying fewer restrictions. The concept of fare families used for upselling the travel products of any airline company (100) requires, as shown in FIG. 1, to set up and maintain a database of fare families (110). As described in the above patent application this is well adapted to promote airline travel products on their own web sites (120) because fare families are defined by the airlines themselves. However, the fare family database requires the definition of group of fares by market. Each fare family carries a level of restrictions (e.g., as already mentioned, tickets issued with some of those fares may be non-refundable and/or non-changeable). They must be associated to a list of fares published by the airline. This link may become heavy to maintain and inappropriate when the definition of the fare families do not only concern a single distribution channel, i.e., the direct distribution via the web site of the airline, but must be extended to many other distribution channels via all the web sites of various travel agencies and other online travel service providers (130). Indeed each travel service provider has generally its own negotiated fares with the airlines. Because the definition of each fare family is based on criteria such as a fare type code, a commercial name, a booking code, and so on, all the specific fares targeted by a fare family need to be individually specified. Hence, defining fare families for each distribution channel (independent travel agencies and travel service providers) would require from the airline to have to replicate and to tailor the definition of the fare families in the databases of each distribution channel (140).

While the concept described in the foregoing patent application is best adapted to a single distribution channel (typically, for the own web site of an airline company) there is a need for a system better suited when a plurality of distribution channels must be considered.

It is then the main object of the invention to describe a system that retains the ability of promoting and upselling all the travel products of an airline company including not only the attractive low-cost travel solutions but also all the less restrictive, yet more profitable, alternatives while not requiring to have to set up and maintain a database of fare families per distribution channel.

It is specifically an object of the invention to describe an online reservation system that dynamically and automatically model all the published fares into fare families sharing common restrictions.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention describes an online reservation system including a fare search engine comprising a database of published fares, a database of rules attached to the published fares and a fare family solver to categorize the published fares into sets of predefined generic fare families on the basis of the rules attached to the published fares. The fare family solver further comprises a generic partitioning fare family database holding the attributes of each predefined generic fare family allowing to determine to which fare family the published fares belong to. The attributes of each predefined generic fare family are first set up by a fare family composer operated by an administrator of the system.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 2:
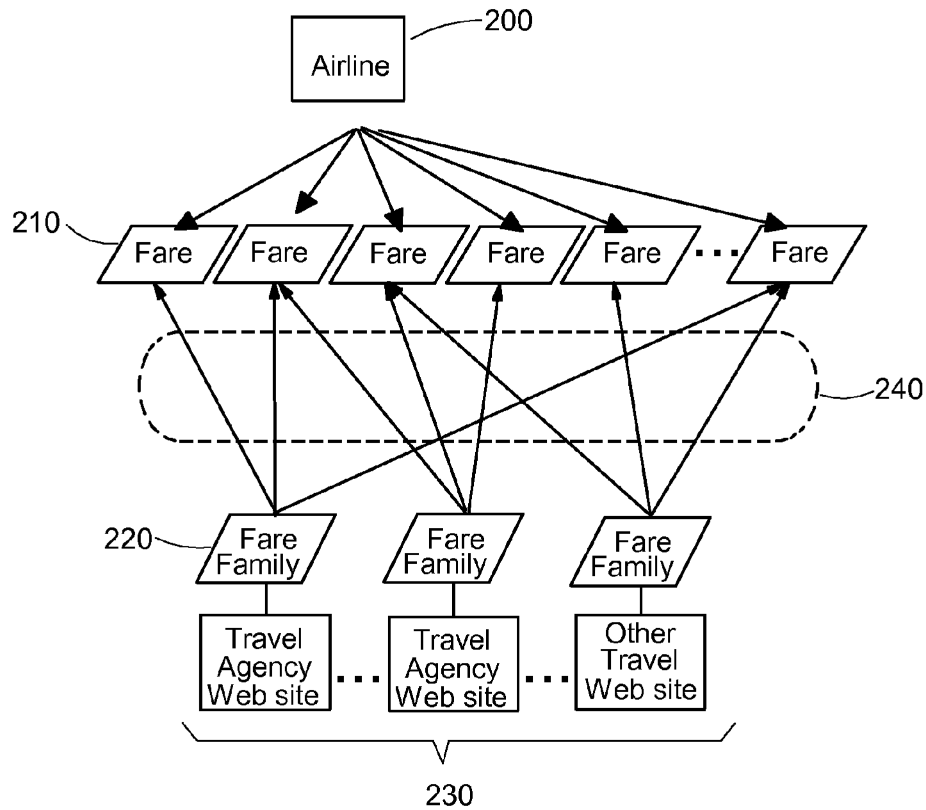
FIG. 2 shows how the invention enables an airline to promote and upsell all of its fares through multiple travel web sites by dynamically defining fare families.

FIG. 2 shows how the invention enables an airline (200) to promote and upsell all of its fares on travel agencies and other travel web sites (230) by dynamically defining fare families.

Figure 1:
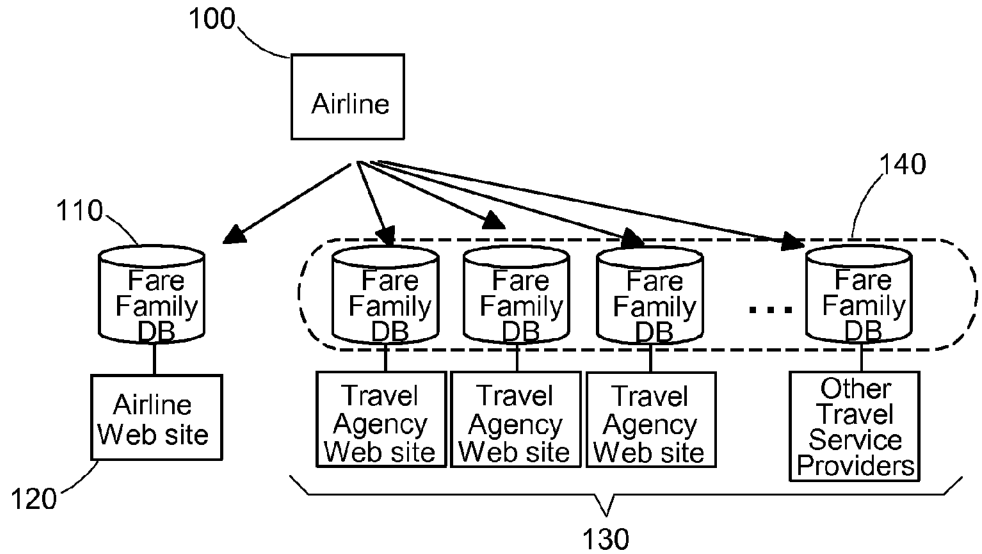
FIG. 1 depicts a state-of-the-art system best adapted to a single distribution channel such as the dedicated website of an airline.

The invention defines implicit links (240) to the fares (210) instead of the explicit links that were manually created in each fare family database of the previous art shown in FIG. 1. Hence, fare families (220) can be automatically established which match all the new fares created by the airline without requiring any updating of the definition of the fare families themselves. The number of implicit links (240) is however an exponentially growing value depending on the number of fares actually published by the airline and of the fare families considered by travel agency and other travel web sites (230) to which fares need to be dynamically associated. Indeed, altogether, the airline industry publishes a huge number of fares that may be updated several times a day. Also, the online indirect distribution of fares may concern thousands of independent webs sites of the kind shown in FIG. 2 (230). Hence, billions of implicit links (240) between the fare families of the travel agencies and of other travel service providers (220) and the fares published by the airlines (210) would need in practice to be updated.

Figure 3:
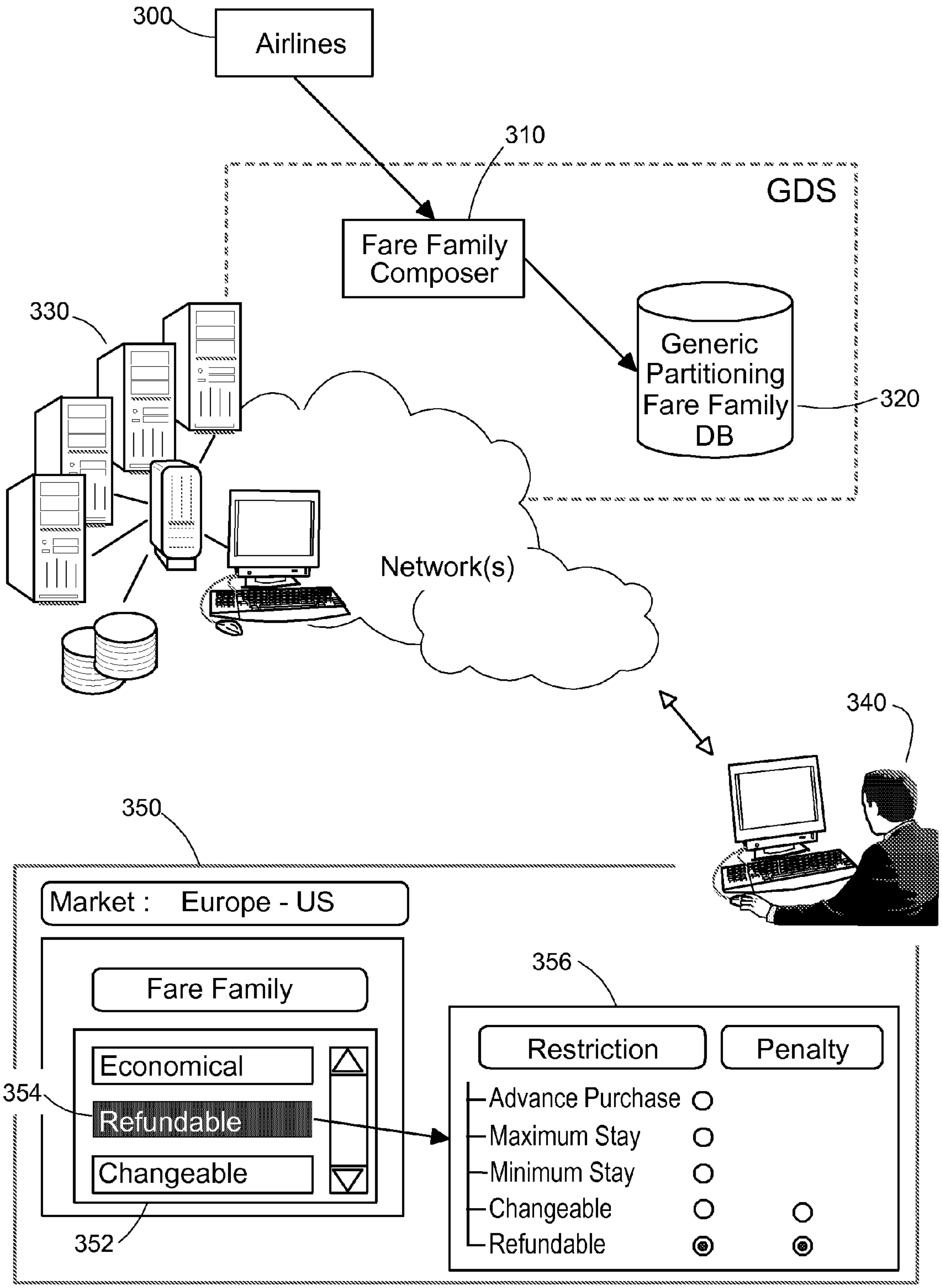
FIG. 3 described the fare family composer aimed at providing airlines with a means of defining families of generic flexible fares.

To get around this problem FIG. 3 introduces a fare family composer (310) aimed at providing airlines with a means of defining fare classes, i.e., flexible fare families. This component offers the possibility of defining a finite number of generic partitioning fare families without the need of having to enumerate all the existing fares. The defined generic fare families are then stored in a single generic partitioning fare family database (320). Composer and database are, e.g., housed by a GDS (330) such as AMADEUS. GDS's provide world-wide travel services on behalf of their affiliated airlines (300). GDS's have large computing, storing and networking facilities (340) capable of supporting many airlines and a lot of their remotely located clients, i.e., the travel agencies and the online travel service providers previously discussed. Updating may be performed in real time without interfering with the running travel applications. Any new fare defined by an airline is associated with the appropriate fare family as soon as it is published. A single definition of a fare family performed by an airline is valid for any affiliated travel web site.

The fare family composer provides airlines with partitioning control over the published fares independently of their definition and independently of the travel agencies and other travel service providers. Hence, the specific data characterizing the fares such as the commercial names and the fare type codes need not to be considered. The travel service providers having negotiated the fares need not to be considered either. The definition of a fare family is based on dynamic fare properties, i.e.: the fare restrictions. Restrictions are defined by the set of rules a fare is associated with, e.g.: the advance purchase restriction, the maximum and/or minimum stay restrictions, the possibility of being changeable and/or refundable, etc. These restrictions are the key elements which define the flexibility of fares. Usually the most flexible fares have no or few restrictions associated with but are obviously the most expensive. On the contrary, the cheapest fares have a lot of associated fare restrictions. The fare family composer thus enables the airlines to specify the fare families on notions which are meaningful for the end users, i.e.: the restrictions which define the different fare levels. Also, these notions are shared by all the airlines irrespective of the myriad of commercial names and codes used by airlines for characterizing the published fares.

As an example, FIG. 3 also shows, under the form of a window (350) displayed on the computer screen of an administrator (340) of the reservation system, a set of three fare families defined by an airline for the Europe-US market. The three generic fares are in this example: Economical, Refundable and Changeable (352). Each fare family is associated with a set of fare restrictions which are the attributes to determine to which family a published fare belongs. They are displayed (356) when the corresponding fare family is selected (354). The defined set of fare families implies for the fare search engines to have to retrieve travel solutions in each family:

- Economical: the fares of this family include the cheapest fares published by the airlines. They are not authorized to be changed or refunded.
- Refundable: as the name suggest, this family is comprised of the class of fares which are authorized to be refundable however with a penalty.
- Changeable: the fares of this fare family are changeable or refundable without penalty and are thus the most expensive fares published by the airlines since they have no associated restriction.

Figure 4:
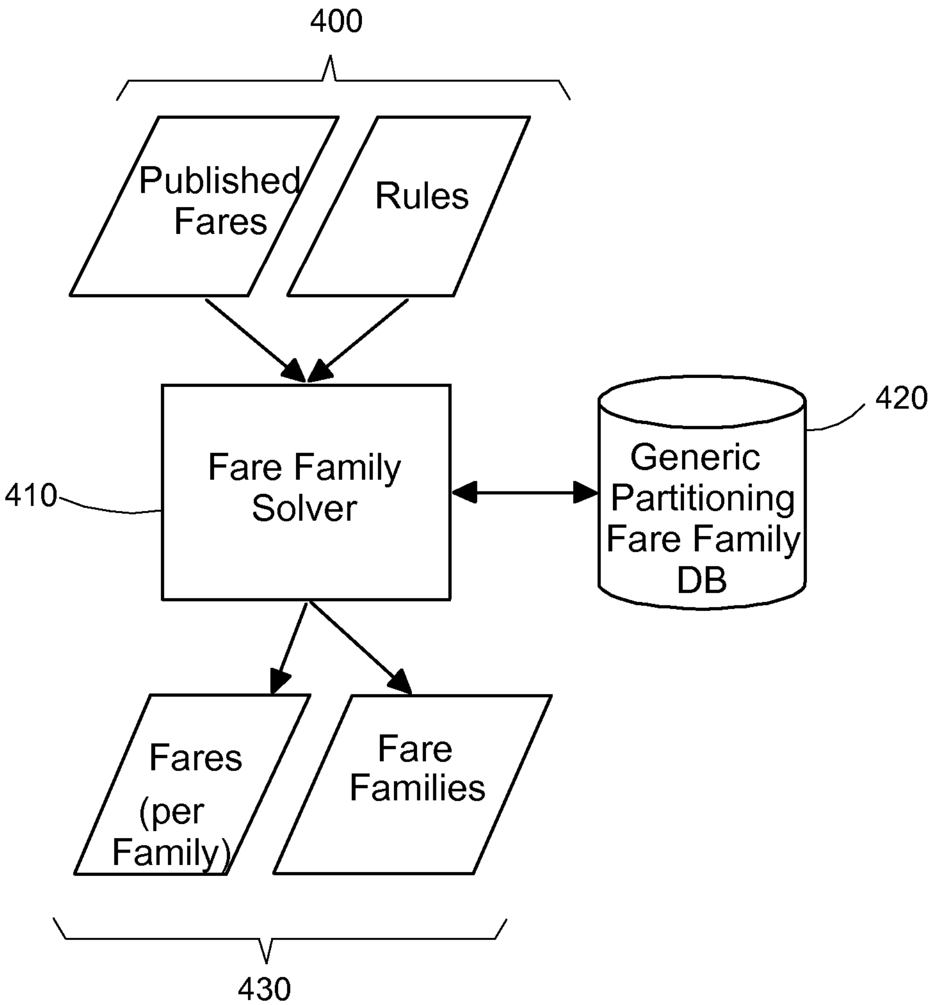
FIG. 4 shows the fare family solver used to categorize the available fares into the defined set of fare families.

FIG. 4 shows the fare family solver (410) used to categorize the available fares into the defined set of fare families.

This component integrates the pricing expertise which evaluates the flexibility of a fare so that to associate it with the appropriate fare family. Inputs of this component are the list of published fares and their associated rules (400). In output (430), the fare family solver returns the list of fares and the defined fare families to which they belong. To achieve this, the fare family solver accesses the generic partitioning fare family database (420) which contains all the fare families defined by the airline using the composer previously described.

Figure 5:
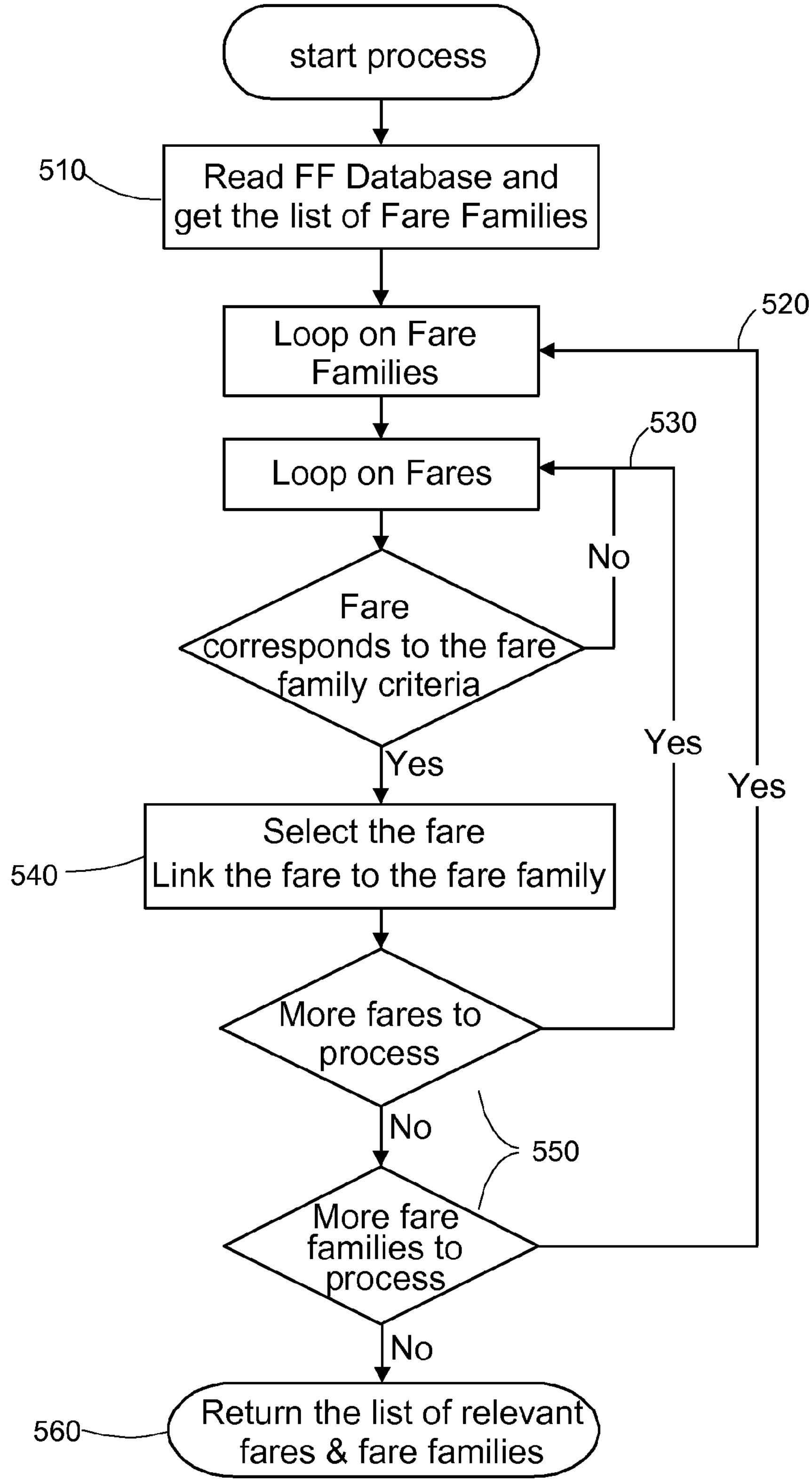
FIG. 5 shows the steps of the method to associate the published fares with the airline defined fare families.

FIG. 5 shows the steps of the method to associate the published fares with the airline defined fare families.

The process starts by reading (510) the generic partitioning fare family database shown in previous figures in order to retrieve the relevant fare families for the end-user request. Fare families are organized by markets, e.g., the Europe-US market shown in FIG. 3. Only the markets involved by the current request need to be considered.

Then, the process loops on all relevant fare families (520). Each published fare given in input is then scanned and analyzed in order to check if it corresponds to the matching criteria of the current fare family (530). The matching criteria are the fare restrictions defined in the fare family database. It is the fare family solver shown in FIG. 4 which compares the restrictions of the current published fare with the ones of the current fare family. Only the relevant fares are kept and categorized as belonging to one of the current set of fare families (540).

Figure 7:
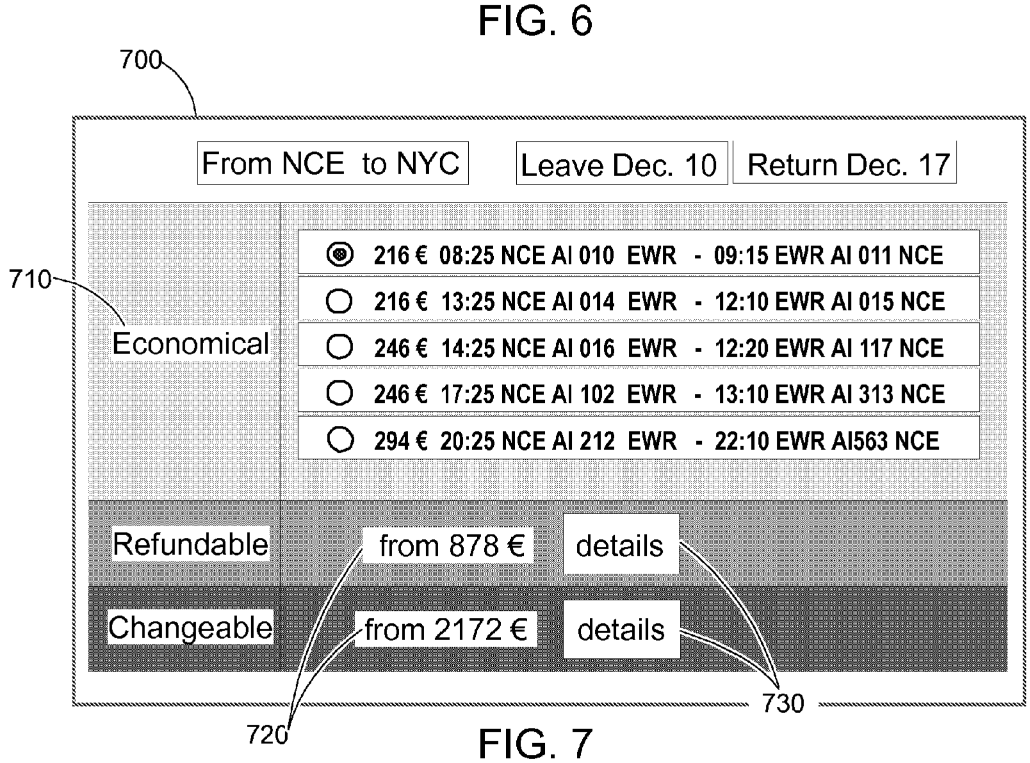
FIG. 7 shows a typical window displayed on the screen of the end-user with the travel solutions found by a fare search engine according to the invention.

The process ends once all published fares and all defined fare families have been analyzed (550). The list of fare families matching the request and the list of associated fares are then returned (560) to the end-user and displayed, e.g., as shown in FIG. 7 (700).

Figure 6:
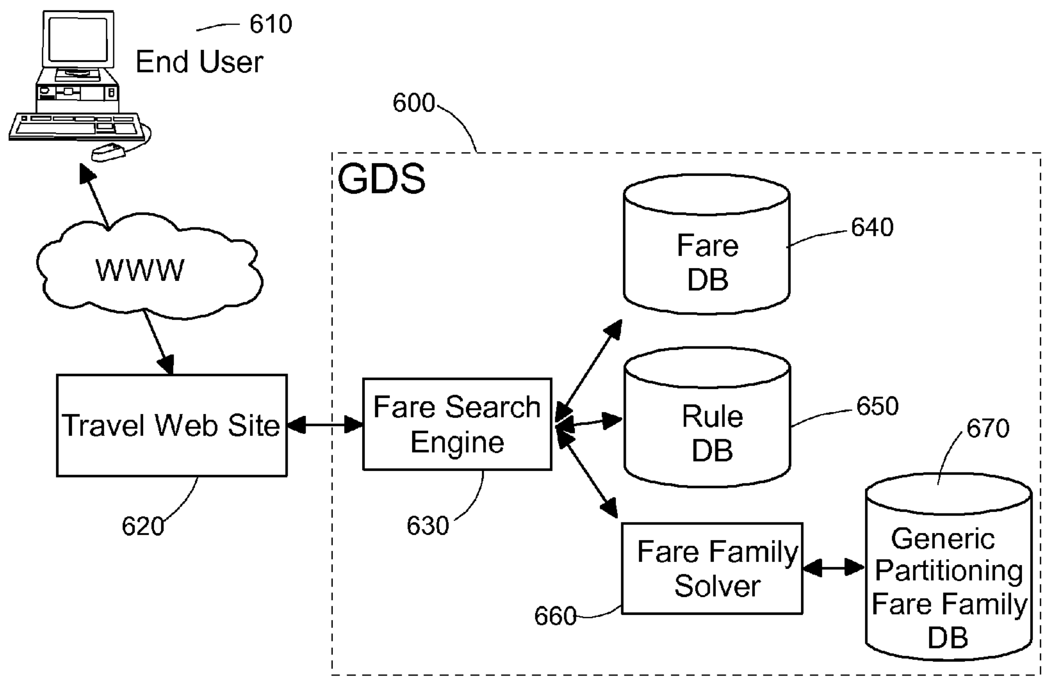
FIG. 6 depicts a fare search system according to the invention.

FIG. 6 depicts a fare search system according to the invention.

As with any travel search application the end-user (610) of a travel website (620) making use of the invention is expected to issue a travel request including an origin, a destination and some travel dates. More inputs and options may have to be entered depending on the way website is designed.

When the request is received, the travel website (e.g., a travel agency website or the website of an online travel service provider) forwards it to the front-end fare search engine (630) of the GDS to which it is affiliated (600). The fare search engine has access to the GDS fare database (640) in order to quote the found travel solutions. The fare search engine also invokes the fare family solver (660) in order to determine to which generic fare family each travel solution belongs to. As previously discussed the fare family solver operates from fare rules contained in the GDS database of rules (650) and from the generic partitioning fare family database (670) described in FIG. 4. Result of the process of the found travel solutions by the fare family solver is a list of fare families relevant for the request along with the correspondence between the fares and the fare families. Fare search engine keeps searching travel solutions for the current request until a predetermined number of solutions have been found in each of the defined fare families so that the end-user can eventually exercise a choice between travel solutions with different levels of constraints at different levels of price. This adds a great deal of flexibility to the travel search application which lets end-user make a choice not only through low-cost solutions if he/she is ready to pay more to get a travel solution with fewer constraints.

FIG. 7 shows a typical window (700) displayed on the screen of the end-user with the travel solutions found by a fare search engine according to the invention.

In this example the end-user has selected (710) the upper part of the window (Economical). Thus, as with a standard fare search engine, the details of the cheapest travel solutions found from Nice, France (NCE) to New York City, USA (NYC) are displayed. However, end-user is also informed of what are the costs (720) of the other found travel solutions with more flexible fares in the other defined fare families (Refundable and Changeable). Details of which can be also displayed in a similar way by clicking the corresponding buttons (730).

The invention claimed is:

1. An online computer reservation system comprising:

one or more programmed computers, the one or more programmed computers providing:

a first database of published fares;

a second database of rules attached to the published fares and comprising fare restrictions selected from advance purchase date, maximum stay at destination, minimum stay at destination, refundability, or changeability; and a fare family solver comprising:

a third database configured to hold a plurality of generic fare families and a plurality of attributes for each generic fare family and configured to associate each published fare with one of the generic fare families, said attributes comprising restrictions selected from advance purchase date, maximum stay at destination, minimum stay at destination, refundability, or changeability, the fare family solver is further configured to categorize the published fares into sets of generic fare families by matching the fare restrictions comprised in the rules attached to the published fares with the restrictions comprised in the attributes.

2. The system of claim 1, further comprising:

a fare family composer to set up the attributes of each generic fare family.

3. The system of claim 2, wherein the attributes of each generic fare family are set up by an authorized administrator of the online reservation system.

4. The system of claim 1, further comprising:

a plurality of travel websites generating a plurality of travel search requests; and a fare search engine in communication with the travel websites for receiving travel search requests and with the fare family solver, said fare search engine configured for defining quoted travel solutions in reply to each search request, for invoking the fare family solver to determine to which generic fare family the fare of the travel solution belongs to, and for returning a response to each search request in destination of a user, said response comprising quoted travel solutions categorized into fare families.

5. The system of claim 4, wherein the fare search engine is operated by a global distribution system on behalf of a plurality of airlines for handling travel requests issued by end-users of a plurality of online travel service providers and travel agencies affiliated with the global distribution system.

6. The system of claim 5, wherein the fare search engine retrieves a predefined number of travel solutions in each category of the fare families concerned by the travel requests received from any of the plurality of online travel service providers and travel agencies.

7. The system of claim 6, wherein the retrieved predefined number of travel solutions are displayed on screens of the end-users on a basis of the fare families they belong to.

8. A method of categorizing travel solutions from a database of published fares, the method comprising:

reading via a programmed computer a list of fare families matching a current travel request from a generic fare family database that holds a plurality of generic fare families and a plurality of attributes for each generic fare family and that associates each published fare with one of the generic fare families, wherein the attributes comprise restrictions selected from advance purchase date, maximum stay at destination, minimum stay at destination, refundability, or changeability; and for each of the fare families and for each published fare;
determining whether fare restrictions for rules attached to a particular published fare match the restrictions of the attributes for a particular generic fare family with a programmed computer, wherein the rules attached to the published fares are stored in a database of rules, and the fare restrictions are selected from advance purchase date, maximum stay at destination, minimum stay at destination refundability, or changeability; and
in response to determining that the fare restrictions of the rules attached to the particular published fare match the restrictions of the attributes of the particular generic fare family, linking via a programmed computer the particular published fare to the particular generic fare family.

9. The method of claim 8, further comprising returning to a fare search engine a list of travel solutions categorized into generic fare families.

10. A non-transitory computer readable storage medium with a computer program stored thereon, the computer program configured upon execution by a computer to cause the computer to:
read a list of fare families matching a current travel request from a generic fare family database that holds a plurality of generic fare families and attributes for each generic fare family and that associates each published fare with one of the generic fare families, wherein the attributes comprise restrictions selected from advance purchase date, maximum stay at destination, and minimum stay at destination, refundability, or changeability; and
for each of the fare families and for each published fare:
determine whether fare restrictions for rules attached to a particular published fare match the restrictions of the attributes for a particular generic fare family, wherein the rules attached to the published fares are stored in a database of rules, and the fare restrictions are selected from advance purchase date, maximum stay at destination, minimum stay at destination, refundability, or changeability, and
in response to determining that the fare restrictions of the rules attached to the particular published fare match the restrictions of the attributes of the particular generic fare family, link the particular published fare to the particular generic fare family.

11. The non-transitory computer readable storage medium of claim 10, wherein the computer program is configured upon execution to cause the computer to return to a fare search engine a list of travel solutions categorized into the generic fare families based at least in part on the particular generic family to which a published fare of the travel solution is linked.

12. A method of processing travel search requests of end-users, the method comprising:
using a database of published fares,
using a database of rules attached to the published fares and comprising at least one fare restriction selected among an advance purchase date, maximum and minimum stays at destination and wherein booked reservations are permitted to be one of refundable and changeable either with or without penalty,
receiving via a programmed computer a plurality of travel search requests from a plurality of travel websites,
defining via a programmed computer travel solutions matching each travel request and quoting the travel solutions according to the published fares by means of a travel search engine, having the travel search engine invoke via a programmed computer a fare family solver to categorize the published fares into sets of predefined generic fare families on a basis of the rules attached to the published fares, the fare family solver comprising a generic partitioning fare family database for storing attributes of predefined generic fare families, holding attributes of predefined generic fare family allowing to determine to which generic fare family the published fares belong to, said attributes comprising restrictions selected among an advance purchase date, maximum and minimum stays at destination and wherein booked reservations are permitted to be one of refundable and changeable with or without penalty, said attributes determining to which fare family the published fares belong to,
obtaining via a programmed computer a published fare from the database of published fares,
obtaining via a programmed computer from the database of rules the rules attached to the obtained published fare,
accessing via a programmed computer the generic partitioning fare family database;
comparing via a programmed computer the fare restrictions of the rules of the obtained published fare with the restrictions of the attributes of generic fare families,
detecting via a programmed computer a matching generic fare family,
categorizing via a programmed computer the obtained published fare as belonging to said matching generic fare family,
determining via a programmed computer to which generic fare family the fare of each travel solution belongs to, and
returning via a programmed computer a response to each search request to a user of the corresponding travel website, said response comprising quoted travel solutions categorized into fare families.

13. The method of claim 12, wherein defining travel solutions matching each travel request is terminated when a predefined number of travel solutions has been reached in each generic fare family.

14. A non-transitory computer readable storage medium with a computer program stored thereon, the computer program configured upon execution by a computer to cause the computer to:
receive a plurality of travel search requests from a plurality of travel websites,
define and quote travel solutions matching each travel request according to published fares,
categorize each published fare into a particular generic fare family of a plurality of generic fare families based at least in part on rules attached to the published fare by:
accessing a generic partitioning fare family database storing attributes of each generic fare family, the attributes comprising restrictions selected from among an advance purchase date, maximum and minimum stays at destination and whether booked reservations are refundable and changeable;
accessing a database of rules attached to the published fares, the database of rules comprising at least one fare restriction selected among an advance purchase date, maximum and minimum stays at destination, whether booked reservations are permitted to be refundable, and whether booked reservations are permitted to be changeable; and
comparing fare restrictions of the rules attached to the published fare with restrictions of attributes of each generic fare family to determine whether the fare restrictions of the rules attached to the published fare match the restrictions of the generic fare family;

categorize each quoted travel solution to a particular generic fare family based on the categorized published fares; and return a response to each search request, the request comprising the quoted travel solutions categorized into generic fare families.

15. The non-transitory computer readable storage medium of claim 14, wherein the computer program is configured upon execution to cause the computer to terminate defining travel solutions matching each travel request when a predefined number of travel solutions has been reached in each generic fare family.

* * * * *

UNITED STATES PATENT AND TRADEMARK OFFICE

CERTIFICATE OF CORRECTION

PATENT NO. : 8,452,624 B2
APPLICATION NO. : 12/812509
DATED : May 28, 2013
INVENTOR(S) : Thierry Dufresne et al.

It is certified that error appears in the above-identified patent and that said Letters Patent is hereby corrected as shown below:

On the Title Page:

At column 2, Item (56), Other Publications, line 1, change “Airwats” to --Airways--.

At column 2, Item (57), Abstract, last line, change “to” to --thereto--.

In the Specification:

At column 3, line number 50, change “webs” to --web--.

In the Claims:

At column 7, claim number 8, line number 9, after “destination”, insert --,--.

Signed and Sealed this
Thirtieth Day of July, 2013

Teresa Stanek Rea
*Acting Director of the United States Patent and Trademark Office*